US006398182B1

(12) United States Patent
Stephenson

(10) Patent No.: US 6,398,182 B1
(45) Date of Patent: Jun. 4, 2002

(54) PILOT SOLENOID CONTROL VALVE WITH AN EMERGENCY OPERATOR

(75) Inventor: Dwight B Stephenson, Delafield, WI (US)

(73) Assignee: HUSCO International, Inc., Waukesha, WI (US)

( * ) Notice: Subject to any disclaimer, the term of this patent is extended or adjusted under 35 U.S.C. 154(b) by 0 days.

(21) Appl. No.: 09/653,601

(22) Filed: Aug. 31, 2000

(51) Int. Cl.[7] .......................... F16K 31/12; F16K 31/14

(52) U.S. Cl. ...................... 251/30.03; 137/489; 251/26; 251/27; 251/38

(58) Field of Search ............................ 137/489; 251/25, 251/26, 27, 28, 30.03; 91/459, 461

(56) References Cited

U.S. PATENT DOCUMENTS 4,535,805 A * 8/1985 Mertz ......................... 137/489
4,627,468 A * 12/1986 Wilke et al. ........... 137/625.64
5,299,592 A * 4/1994 Swanson ..................... 137/59
5,564,673 A * 10/1996 Pieren ...................... 137/492.5
5,878,647 A 3/1999 Wilke et al.
6,017,015 A * 1/2000 Heusser ................... 251/30.04
6,149,124 A * 11/2000 Yang ....................... 251/30.03

* cited by examiner

*Primary Examiner*—Michael Powell Buiz
*Assistant Examiner*—Ramesh Krishnamurthy
(74) *Attorney, Agent, or Firm*—George E. Haas; Quarles & Brady LLP

(57) ABSTRACT

A discharge valve is provided to open an electrically controlled pilot valve in emergency situations such as during an electrical or hydraulic failure. The discharge valve has a poppet that operates in response to a pressurized control signal, which may be produced by a hand operated pump. When the poppet opens in response to the control signal, a path is established for fluid to flow from a control chamber of the pilot valve, thereby opening the latter valve.

17 Claims, 3 Drawing Sheets

PILOT SOLENOID CONTROL VALVE WITH AN EMERGENCY OPERATOR

BACKGROUND OF THE INVENTION

The present invention relates to pilot operated proportional hydraulic valves, and particularly to such valves which are electrically controlled.

Industrial equipment, such as lift trucks, have moveable members which are operated by hydraulic cylinder and piston arrangements. Application of hydraulic fluid to the cylinder traditionally has been controlled by a manual valve, such as the one described in U.S. Pat. No. 5,579,642. A manual operator lever was mechanically connected to move a spool within the valve. Movement of the spool into various positions with respect to cavities in the valve body enables pressurized hydraulic fluid to flow from a pump to one of the cylinder chambers and be drained from another chamber. The rate of flow into the associated chamber is varied by varying the degree to which the spool is moved, thereby moving the piston at proportionally different speeds.

Because the manual valves are mounted in the operator cab of the equipment, individual hydraulic lines have to be run from the valve to the associated cylinders. There is a present trend away from manually operated hydraulic valves toward electrical controls and the use of solenoid valves. This type of control simplifies the hydraulic plumbing as the control valves do not have to be located in the operator cab. Instead, the solenoid valves are mounted adjacent the associated cylinders, thereby requiring that only a hydraulic line from pump and another line back to the fluid tank need to be run through the equipment. Although electrical signals have to be transmitted from the operator cab to the solenoid valves, wires are easier to run and less prone to failure than pressurized hydraulic lines.

Solenoid operated pilot valves are well known for controlling the flow of hydraulic fluid and employ an electromagnetic coil which moves an armature in one direction to open a valve. The armature acts on a pilot poppet that controls the flow of fluid through a pilot passage in a main valve poppet. The amount that the valve opens is directly related to the magnitude of electric current applied to the electromagnetic coil, thereby enabling proportional control of the hydraulic fluid flow. A spring acts on the armature to close the valve when electric current is removed from the solenoid coil. One type of solenoid operated pilot valve is described in U.S. Pat. No. 5,878,647.

Industrial lift trucks require that the boom be capable of being lowered in a controlled manner in the event of a failure of the hydraulic or electrical systems. This is easily accomplished when the hydraulic actuators are controlled by valves in the operator cab. However, remotely located solenoid valves make the manual lowering difficult to achieve.

SUMMARY OF THE INVENTION

The present invention provides a mechanism for operating a hydraulic actuator in a controlled manual manner in the event of a failure of either or both of the hydraulic or electrical systems. This mechanism is particularly adapted to equipment with solenoid valves in remote locations adjacent to the hydraulic actuators.

A pilot operated control valve has a main valve poppet that selectively engages a valve seat to control flow of fluid through the valve. As in conventional pilot valves, pressure in a control chamber on a side of the main valve poppet that is remote from the valve seat, determines the position of the poppet and thus the open or closed state of the valve. During normal operation the pressure in the control chamber is determined by a pilot poppet that is operated by a device, such as an electromagnetic solenoid.

The present invention adds a discharge valve that can be employed during an emergency to open the pilot operated control valve. The discharge valve responds to a control signal by releasing pressure in a control chamber of pilot operated control valve and move the main valve poppet to an open position.

In the preferred embodiment of the emergency override mechanism, an auxiliary bore is formed in the body of the pilot operated control valve. A discharge poppet is slidably located within the auxiliary bore, thereby defining a first cavity on one side of the discharge poppet and a second cavity on another side of that poppet. The first cavity receives the control signal and the second cavity is coupled to a fluid reservoir. The discharge poppet also forms an intermediate cavity in the auxiliary bore, which is coupled to the control chamber of the pilot operated control valve. The position of the discharge poppet in the pilot operated control valve regulates flow of fluid between the control chamber and the second cavity in response to the control signal pressure in the first cavity.

A manually operated hand pump or other source of pressurized fluid is used in an emergency to apply the control signal to the discharge poppet and open the pilot operated control valve.

DETAILED DESCRIPTION OF THE INVENTION

Figure 1:
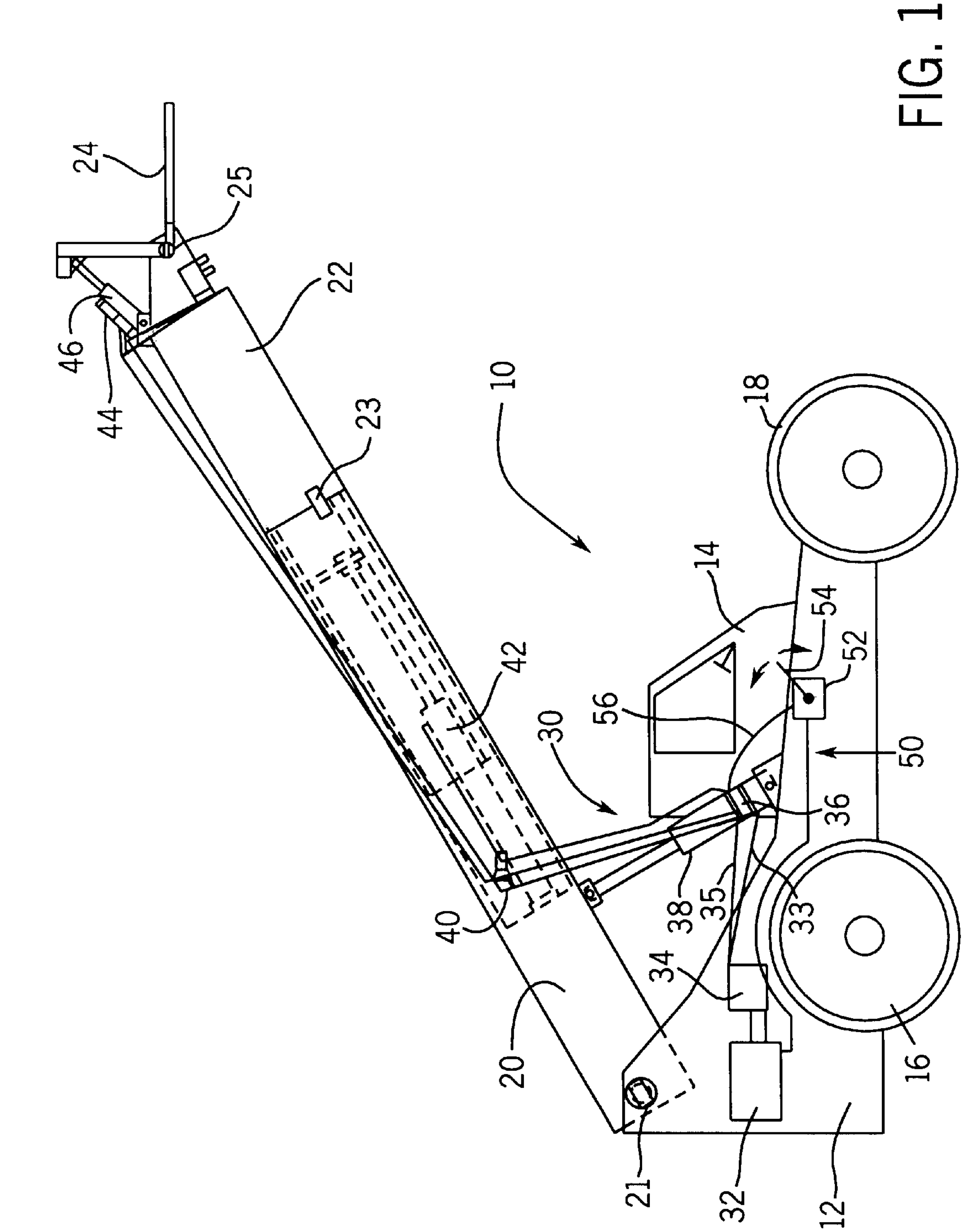
FIG. 1 is a schematic representation of an industrial lift truck that incorporates the present invention.

With initial reference to FIG. 1, an industrial lift truck 10, such as the illustrated telehandler, has a carriage 12 with an operator cab 14. The carriage 12 supports an engine or battery powered motor (not shown) for driving a pair of rear wheels 16. A pair of front wheels 18 are steerable from the operator cab 14.

A boom 20 is pivotally attached to the rear of the carriage 12. A first sensor 21 provides a signal indicating the angle to which the boom has been pivoted. A telescopic arm 22 slides within the boom 20 and a second sensor 23 provides a signal which indicates the distance that the arm 22 extends from the boom 20. A pair of forks 24 is pivotally mounted at the end of the arm 22 that is remote from the boom 20. The forks 24 are of conventional design for lifting goods packaged on a pallet. A third sensor 25 provides a signal which indicates the angle to which the forks have been pivoted. The signals from the sensors 21, 23, and 25 are applied to a microcontroller (not shown) on the carriage 12.

The industrial lift truck 10 has a hydraulic system 30 which controls the boom 20, arm 22, and forks 24. Hydraulic fluid for that system 30 is held in a reservoir, or tank, 32 from which the fluid is drawn by a conventional electric pump 34 and fed into a pump supply line 33 that runs through the truck. A tank line 35 also runs through the truck and provides a path for the hydraulic fluid to return to the tank 32.

The pump supply line 35 furnishes hydraulic fluid to a first electrohydraulic valve (EHV) assembly 36 which may be similar to the one described in U.S. Pat. No. 5,878,647, the description of which is incorporated herein by reference. The first EHV assembly 36 has four solenoid valves that control the flow of fluid to a boom hydraulic cylinder 38 that raises and lowers the boom 20. A first pair of the solenoid valves governs the fluid flow to and from a first chamber on one side of the piston in the boom hydraulic cylinder 38, and a second pair of the solenoid valves controls the fluid flow to and from a second chamber on the other side of the piston. By sending pressurized fluid into one cylinder chamber and draining the fluid from the other chamber, the boom 20 can be raised and lowered in a controlled manner.

The pump supply line 33 and the tank line 35 extend onto the boom 20 and are connected to a second EHV assembly 40 that controls the flow of hydraulic fluid into and out of an arm hydraulic cylinder 42. This enables the arm 22 to be extended from and retracted into the boom 20 in a controlled manner. The pump supply and tank lines 33 and 35 extend along the boom and arm to a third EHV assembly 44 that controls the fluid flow into and out of a hydraulic cylinder 46 that tilts the forks 24.

With continuing reference to FIG. 1, the hydraulic system 30 provides an emergency override mechanism 50 to lower the boom 20 in the event of a failure of either or both of the hydraulic and electrical systems on the industrial lift trunk 10. This override mechanism 50 includes a hand pump 52 which when manually operated draws hydraulic fluid from the tank 32 upon manual operation of a lever 54. The output of the hand pump 52 is connected by line 56 to the first and second EHV assemblies 36 and 40 for the cylinders 38 and 42 of the boom 20 and the arm 22, respectively.

Figure 2:
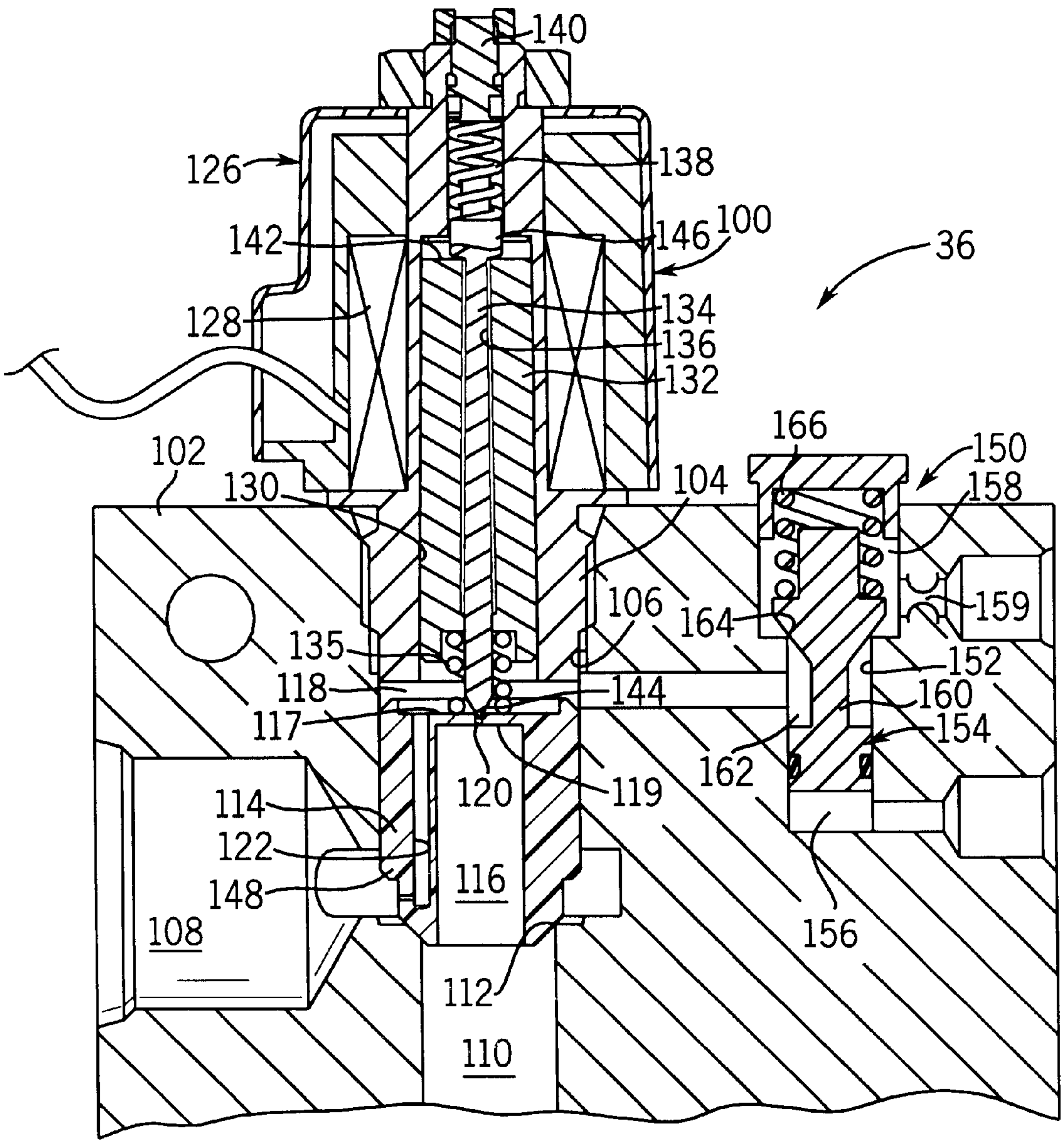
FIG. 2 is a cross sectional view of part of a control valve assembly containing an override mechanism for emergency operation.

In order to understand the operation of the emergency override mechanism 50, it will be beneficial to have an understanding of the solenoid valve that controls the draining of fluid from cylinder 38 to lower the boom 20. Referring to FIG. 2, the first EHV assembly 36 has a solenoid operated primary valve 100 comprising a cylindrical valve cartridge 104 mounted in a longitudinal bore 106 of a valve body 102. The valve body 102 has a transverse inlet passage 108 which communicates with the longitudinal bore 106. The inlet passage is coupled to the lower chamber of the boom hydraulic cylinder 38, whereby opening the primary valve 100 drains fluid from that chamber to tank lowering the boom 20. An outlet passage 110 extends from an interior end of the longitudinal bore 106 through the valve body 102 and communicates with the system tank 32. A valve seat 112 is formed between the inlet and outlet passages 108 and 110.

A main valve poppet 114 slides within the longitudinal bore 106 with respect to the valve seat 112 to control flow of hydraulic fluid between the inlet and outlet passages. A central cavity 116 is formed in the main valve poppet 114 and extends from an opening at the outlet passage 110 to a closed end 117. The thickness of the wall at the closed end 117 forms a flexible diaphragm 119 and a pilot passage 120 extends through that diaphragm. The main valve poppet 114 defines control chamber 118 in the longitudinal bore 106 on the remote side of the diaphragm 119 from central cavity 116. The opposite sides of the diaphragm 119 are exposed to the pressures in the control chamber 118 and the poppet's central cavity 116. A supply channel 122 extends through the main valve poppet 114 from the supply passage 108 to the control chamber 118.

Movement of the main valve poppet 114 is controlled by a solenoid 126 comprising an electromagnetic coil 128, an armature 132 and a pilot poppet 134. The armature 132 is positioned within a bore 130 through the cartridge 104 and a first spring 135 biases the main valve poppet 114 away from the armature. The pilot poppet 134 is located within a bore 136 of the tubular armature 132 and is biased toward the armature by a second spring 138 that engages an adjusting screw 140 threaded into the cartridge bore 130. The electromagnetic coil 128 is located around and secured to cartridge 104. The armature 132 slides within the cartridge bore 130 away from main valve poppet 114 in response to an electromagnetic field created by applying electric current to energize the electromagnetic coil 128.

In the de-energized state of the electromagnetic coil 128, a second spring 138 forces the pilot poppet 134 against end 142 of the armature 132, pushing both the armature and the pilot poppet toward the main valve poppet 114. This results in a conical tip 144 of the pilot poppet 134 entering and closing the pilot passage 120 in the main valve poppet, thereby terminating cutting off communication between the control chamber 118 and the outlet passage 110.

Energizing the primary valve 100 controls the flow of hydraulic fluid between the inlet and outlet passages 108 and 110. The rate of hydraulic fluid flow through the valve is directly proportional to the magnitude of electric current applied to the coil 128. The electric current generates an electromagnetic field which draws the armature 132 into the solenoid coil 128 and away from the main valve poppet 114. Because end 142 of the armature 132 engages a shoulder 146 on the pilot poppet 134, that latter element also moves away from the main valve poppet 114, thereby allowing hydraulic fluid to flow from the inlet passage 108 through the control chamber 118, pilot passage 120 and the outlet passage 110.

The flow of hydraulic fluid through the pilot passage 120 reduces the pressure in the control chamber 118 to that of the outlet passage. Thus the higher inlet passage pressure that is applied to the surface 148 forces main valve poppet 114 away from valve seat 112, thereby opening direct communication between the inlet passage 108 and the outlet passage 110. Movement of the main valve poppet 114 continues until contact occurs with the conical tip 144 of the pilot poppet 134. Thus, the size of this valve opening and the flow rate of hydraulic fluid there through are determined by the position of the armature 132 and pilot poppet 134. Those positions are in turn controlled by the magnitude of current flowing through the electromagnetic coil 128.

Emergency operation of the primary valve 100 is provided by a discharge valve 150. The discharge valve 150 includes a valve element, such as discharge poppet 154, that is slidably received in the auxiliary bore 152 thereby defining a first cavity 156 and a second cavity 158 on opposite sides of the discharge poppet. The first cavity 156 is connected to the line 56 from the hand pump 52 and the second cavity 158 is connected to the system tank 32 through an optional orifice 159. The discharge poppet 154 has an central portion 160 with a reduced cross section thereby defining an intermediate cavity 162 that communicates with the control chamber 118 of the primary valve 100.

A valve seat 164 is formed in the auxiliary bore 152 between the second and intermediate cavities 158 and 162. A spring 166 biases the discharge poppet 154 against the valve seat 164 to close communication between those cavities 158 and 162 during normal operation of the primary valve 100.

Another discharge valve of this design is provided in the second EHV assembly 40 to drain fluid from the lower chamber of the arm cylinder 42 in the event of an emergency.

During emergency lowering of the boom 20 and arm 22, the hand pump 52 in FIG. 1 is manually operated to pressurize its outlet line 56 with fluid. That pressurized fluid is applied via line 56 to the first chamber 156 of the discharge valve 150 in FIG. 2. When the fluid pressure from the hand pump 52 exceeds the force exerted on the discharge poppet 154 due to the spring force of spring 166, the discharge poppet 154 moves away from valve seat 164. This movement opens a path between the primary valve's control chamber 118 and the system tank via the second cavity 158.

This action reduces the pressure in the control chamber 118 of the primary valve 100 to the tank pressure, thereby enabling the pressures applied to other surfaces of the main valve poppet 114 to force the primary valve open. Thus fluid is able to flow from the lower chamber of the boom cylinder 38 through passages 108 and 110 of the primary valve 100 to the system tank. The boom 20 lowers by gravity as this fluid drains from the boom cylinder 38.

A similar action occurs at the discharge valve in the second EHV assembly 40 causing fluid to drain from the lower chamber of the arm cylinder 42. This results in gravity retracting the arm 22 into the boom 20. In some industrial lift trucks, such as the telehandler shown in FIG. 1, the effect of gravity may not be sufficient to retract the arm 22 when the boom is nearly horizontal. In that case other options have to be provided. One alternative, is to run separate lines from the hand pump 52 to the EHV assemblies 36 and 40 for the boom and arm cylinders 38 and 42 and provide separate manual shut-off valves for each line. This enables the hand pump 52 to operate the second EHV assembly 40 to lower only the arm, while the boom is raised and maximum gravity acts on the arm. Then the shut-off valves are changed so that the hand pump 52 operates the first EHV assembly 36 to lower the boom 20. Separate hand pumps also can be provided for each function.

Alternatively, the two functions can be configured for sequential operation by using different spring forces in the discharge valves for each function. For example, the discharge valve 150 for the second EHV assembly 40, that controls arm movement, can have a lesser spring force than the discharge valve for the first EHV assembly 36, that controls boom movement. Therefore, the discharge valve 150 for the second EHV assembly 40 will open first in response to the hand pump 52 causing the arm 22 to retract. Thereafter, the discharge valve for the first EHV assembly 36 opens causing subsequent lowering of the boom 20.

Figure 3:
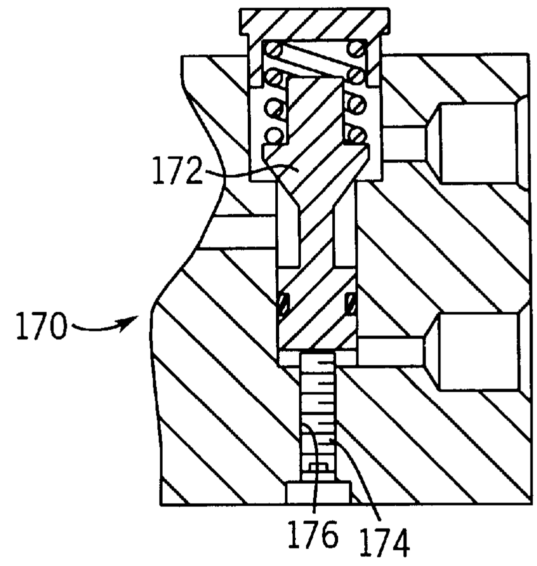
FIG. 3 is a cross sectional view of an override mechanism that has an alternation device.

FIG. 3 illustrates an embodiment of a discharge valve 170 that is operated mechanically rather than hydraulically by a hand pump. In this version, the control force that acts to open the discharge poppet 172 is provided by a set screw 174 that is threaded into an aperture 176 in th valve body. The equipment operator accesses the set screw 174 by inserting a screwdriver or hexagonal driver through an exterior opening of the aperture. When the set screw 174 is turned farther into the aperture, it contacts the interior end of the discharge poppet 172 and moves that poppet to open communication between the primary valve's control chamber 118 and the system tank 32. This releases pressure in that control chamber 118 and opens the primary valve. Other mechanisms which mechanically engage the discharge poppet 172 can be employed apply the control force that opens the discharge valve 170.

Figure 4:
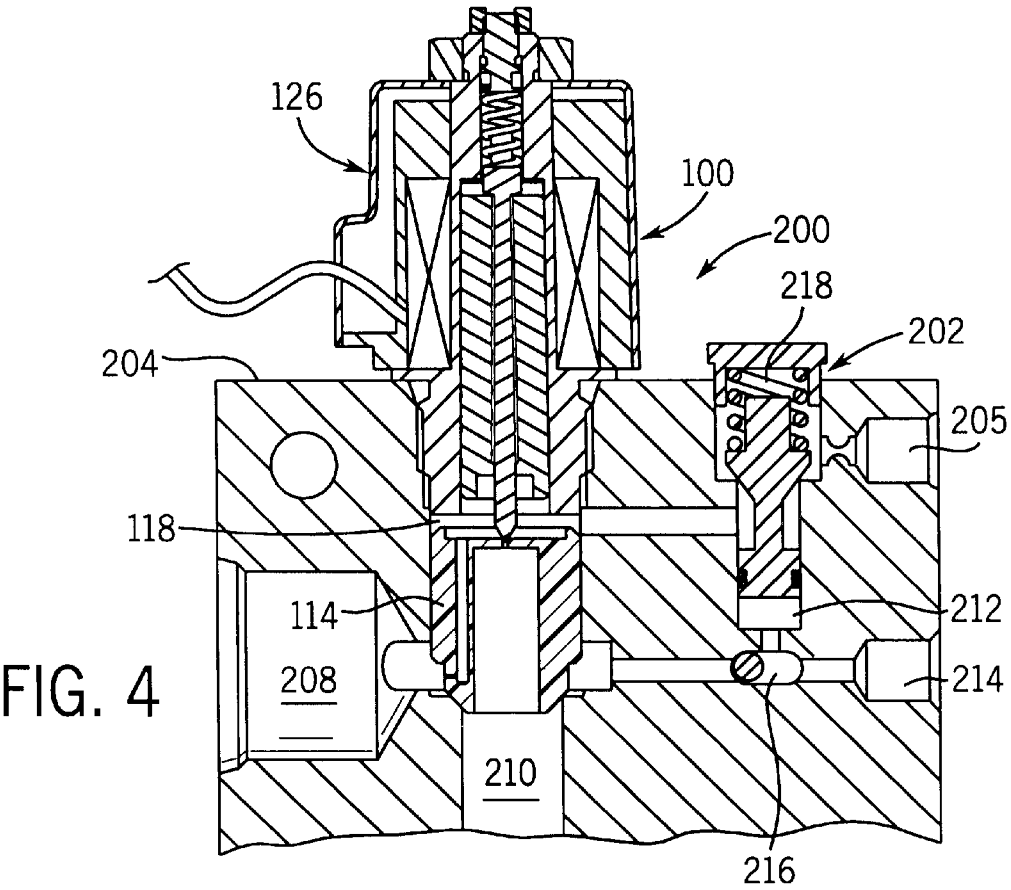
FIG. 4 is a cross sectional view of a control valve assembly that incorporates a second embodiment of an emergency override mechanism.

FIG. 4 shows an electrohydraulic valve assembly 200 in which the discharge valve 202, used during emergency operation, also acts as a pressure relief valve at other times. The EHV assembly 200 has a body with an inlet passage 208 and outlet passage 210. A solenoid operated primary valve 100, with the same construction as the identically numbered valve in FIG. 2, controls the flow of hydraulic fluid between the inlet and outlet passages 208 and 210.

The discharge valve 202 is similar to discharge valve 150 in that it controls the flow of fluid from the control chamber 118 of the primary valve 100 to a port 205 that is connected to the system tank 32. That control is in response to pressure in cavity 212. However, whereas that pressure results solely from the hand pump 52 for the valve in FIG. 2, the cavity 212 in this embodiment also can receive pressurized fluid from the inlet passage 208 of the valve assembly 200. Specifically, both the inlet passage 208 and the hand pump port 214 are connected to separate inlets of a shuttle valve 216 that has a outlet connected to the discharge valve cavity 212.

When the hand pump 52 is not being used, the shuttle valve 216 communicates the pressure in the inlet passage 208 of the valve assembly 200 to the cavity 212 of the discharge valve 202. When that pressure is excessively high, the force of spring 218 is exceeded and the discharge valve 202 opens relieving the pressure in the control chamber 118 of the primary valve 100. This action causes that latter valve 100 to open and release the inlet passage pressure.

During operation of the hand pump 52 when pressure at the hand pump port 214 exceeds the pressure at the inlet passage 208, the shuttle valve 216 communicates the pump pressure to the cavity 212 of the discharge valve 202. Eventually, the discharge valve 202 opens and relieves the pressure in the control chamber 118 of the primary valve 100, as described previously with respect to the embodiment in FIG. 2 and hand pump operation during an emergency.

What is claimed is:

1. In a pilot operated control valve having a body defining an inlet passage and an outlet passage, a main valve poppet having a pilot passage there through and selectively engaging a valve seat within the body to control flow of fluid between the inlet passage and the outlet passage, a control chamber on a side of the main valve poppet remote from the valve scat, and a pilot poppet which selectively engages the main valve poppet to control flow of fluid between the control chamber and the pilot passage; an override mechanism comprising:

a discharge valve connected to the control chamber and operable in response to a control force to release pressure in the control chamber thereby causing the main valve poppet to open fluid communication between the inlet passage and the outlet passage.

2. The override mechanism recited in claim 1 wherein the discharge valve comprises a valve element that moves in response to the control force to release pressure in the control chamber, and the control force comprises a pressure applied to one side of the valve element.

3. The override mechanism recited in claim 2 further comprising a shuttle valve having one inlet connected to a source of the control signal, another inlet connected to one of the inlet passage and the outlet passage and an outlet coupled to apply fluid to the one side of the valve element.

4. The override mechanism recited in claim 1 wherein the discharge valve comprises a valve element that moves in response to the control force to release pressure in the control chamber, and further comprising a manually operable device which mechanically engages the valve element to apply the control force.

5. The override mechanism recited in claim 1 further comprising a manually operable device connected to the discharge valve and emitting a fluid under pressure which provides the control force.

6. The override mechanism recited in claim 1 wherein the body has an auxiliary bore, and the discharge valve comprises:

a valve element slidably located within the auxiliary bore and defining a first cavity in the auxiliary bore on one side of the valve element and a second cavity in the auxiliary bore on another side of the valve element, the first cavity for receiving fluid which provides the control force and the second cavity being, coupled to a fluid reservoir, the valve element also defining an intermediate cavity which is coupled to the control chamber and controlling flow of fluid between the control chamber and the second cavity.

7. The override mechanism recited in claim 6 wherein the valve element has portion with a reduced cross section that defines the intermediate cavity.

8. The override mechanism recited in claim 6 further comprising a manually operable device connected to the first cavity to apply a fluid under pressure to the first cavity.

9. The override mechanism recited in claim 6 further comprising a manually operated pump connected to apply a fluid under pressure to the first cavity.

10. The override mechanism recited in claim 7 further comprising a spring which biases the valve member into a position at which the valve member blocks flow of fluid between the control chamber and the second cavity.

11. In a pilot operated control valve having a body defining an inlet passage and an outlet passage, a main valve poppet selectively engaging a valve seat within the body to control flow of fluid between the inlet passage and the outlet passage, and a control chamber on a side of the main valve poppet remote from the valve seat; an override mechanism comprising:

the body having an auxiliary bore and a control signal inlet;

a discharge poppet slidably located within the auxiliary bore, and defining a first cavity on one side of the discharge poppet and a second cavity on another side of the discharge poppet, the first cavity connected to the control signal inlet and the second cavity being coupled to a fluid reservoir, the discharge poppet also defining an intermediate cavity which is connected to the control chamber, wherein pressure at the control signal inlet controls a position of the discharge poppet within the auxiliary bore and thereby flow of fluid between the control chamber and the second cavity; and a biasing element that urges the discharge poppet into a position at which the valve member blocks flow of fluid between the control chamber and the second cavity.

12. The override mechanism recited in claim 11 further comprising a manually operable device connected to the control signal inlet to apply a fluid under pressure to the first cavity.

13. The override mechanism recited in claim 11 further comprising a manually operated pump connected to the control signal inlet to apply a fluid under pressure to the first cavity.

14. The override mechanism recited in claim 11 wherein the poppet has portion with a reduced cross section that defines the intermediate cavity.

15. An override mechanism for a hydraulic system having a first actuator controlled by a first main valve and a second actuator controlled by a second main valve; wherein each of the first and second main valves has an inlet passage and an outlet passage, a main valve poppet having a pilot passage there through and controlling flow of fluid between the inlet passage and the outlet passage, a control chamber on one side of the main valve poppet, and a pilot poppet which selectively engages the main valve poppet to control flow of fluid between the control chamber and the pilot passage; the override mechanism comprising:

a first discharge valve connected to the control chamber of the first main valve and operable in response to a control signal to release pressure in the control chamber of the first main valve and open fluid communication between the inlet passage and the outlet passage of the first main valve; and a second discharge valve connected to the control chamber of the second main valve and operable in response to the control signal to release pressure in the control chamber of the second main valve and open fluid communication between the inlet passage and the outlet passage of the second main valve.

16. The override mechanism recited in claim 15 wherein the first discharge valve has a first spring force acting on a valve element and the second discharge valve has a second spring force acting on another valve element, wherein the first spring force is different than the second spring force so that the first discharge valve and the second discharge valve operate sequentially in response to the control signal.

17. The override mechanism recited in claim 15 further comprising a manually operable device the emits a fluid under pressure which provides the control signal.

* * * * *